(12) United States Patent
Levy et al.

(10) Patent No.: US 6,721,725 B2
(45) Date of Patent: Apr. 13, 2004

(54) METHOD OF PARALLEL TRIGGER EXECUTION IN AN ACTIVE DATABASE

(75) Inventors: Eliezer Levy, Haifa (IL); Yuval Sherman, Haifa (IL); Nitzan Peleg, Haifa (IL); Boaz Ben-Zvi, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 382 days.

(21) Appl. No.: 09/823,337

(22) Filed: Mar. 29, 2001

(65) Prior Publication Data

US 2002/0143745 A1 Oct. 3, 2002

(51) Int. Cl.⁷ .............................................. G06F 17/30
(52) U.S. Cl. ........................................ 707/2; 707/103
(58) Field of Search ............................... 707/1, 2, 3, 4, 707/5, 6, 7, 8, 9, 10, 100, 103; 709/217; 717/141

(56) References Cited

U.S. PATENT DOCUMENTS

| 5,680,602 | A | * | 10/1997 | Bloem et al. | 707/1 |
|---|---|---|---|---|---|
| 5,864,842 | A | | 1/1999 | Pederson et al. | 707/2 |
| 5,873,075 | A | * | 2/1999 | Cochrane et al. | 707/2 |
| 5,875,334 | A | | 2/1999 | Chow et al. | 707/2 |
| 5,881,232 | A | | 3/1999 | Cheng et al. | 709/217 |
| 5,884,299 | A | | 3/1999 | Ramesh et al. | 707/2 |
| 5,890,148 | A | | 3/1999 | Bhargava et al. | 707/2 |
| 5,930,795 | A | | 7/1999 | Chen et al. | 707/100 |
| 5,950,188 | A | | 9/1999 | Wildermuth | 707/3 |
| 6,385,603 | B1 | * | 5/2002 | Chen et al. | 707/3 |
| 6,405,212 | B1 | * | 6/2002 | Samu et al. | 707/103 R |
| 6,594,656 | B1 | * | 7/2003 | Arlein et al. | 707/4 |

* cited by examiner

*Primary Examiner*—Diane D. Mizrahi
*Assistant Examiner*—Yicun Wu

(57) ABSTRACT

A method for executing after-triggers in an active database. A tree is constructed for each after-trigger and an operator tree is constructed for the statement that activates the trigger. The method joins each of the trees for the activated row-after triggers to the operator tree for pipelined execution with the operator tree. The trees for the activated row-after triggers form a group and each of the trees within the group execute in parallel with each other. The method joins trees for activated statement-after triggers to the operator tree for execution subsequent to the execution of the operator tree, the statement after trigger trees receiving rows from a temporary table that accumulates affected rows from the operator tree. Trees for activated statement after triggers form a group and each of the trees within the group execute in parallel with each other.

6 Claims, 8 Drawing Sheets

METHOD OF PARALLEL TRIGGER EXECUTION IN AN ACTIVE DATABASE

CROSS-REFERENCE TO RELATED APPLICATIONS

This application is related to U.S. Application entitled "A METHOD OF EXECUTING CONFLICTING TRIGGERS IN AN ACTIVE DATABASE", Ser. No. 09/823,340, filed on Mar. 29, 2001, now pending; and to U.S. Application entitled "A METHOD OF EXECUTING BEFORE-TRIGGERS IN AN ACTIVE DATABASE, Ser. No. 09/822, 996 now pending, filed on Mar. 29, 2001.

FIELD OF THE INVENTION

The present invention relates generally to executing triggers in active relational databases and more specifically to the concurrent execution of after-triggers in a relational data base management system.

DESCRIPTION OF THE RELATED ART

Database management systems (DBMS) 11, such as the system shown in FIG. 1, have become the dominant means of keeping track of data, especially for servers connected to the Internet. These systems take an organized approach to the storage of data by imposing a data model, typically a relational data model, on the data 17 that is stored in the database 15. Included in the typical DBMS are a Query Processing Engine 13, a File Access and Storage Management subsystem 21 for accessing the database 15, a Concurrency Control subsystem 19 for managing locks needed for concurrency on database items (tables and rows) and a Recovery Control Subsystem 23 for restoring the DBMS 23 to a consistent state after a fatal error. The latter two subsystems 19, 23, are interconnected with the File Access and Storage Management subsystem 21.

In the relational data model, data is stored as a relation, which has two aspects, the relation schema and the relation instance. The relation schema specifies the relation's name, and the name and domain of each column in the relation. The relation instance is a set of records (also called rows or tuples) that conform to the relation schema. A relation instance is therefore a table of records, each of which has a column that meets the domain constraints imposed by the schema.

Not only does the DBMS impose a constraint on storage of data, a DBMS usually formalizes the means by which information may be requested from the database. In particular, a query language is specified by which questions may be put to the database. The language is usually based on a formal logic structure such as relational algebra or calculus. Queries are usually carried out in the DBMS 11 by a Query Processing Engine 13, which has a number of components for parsing a query, creating a query plan, and evaluating the query plan. In particular, a component of the Query Processing Engine 13, a Query Optimizer, creates one or more query plans, each in the form of a tree of relational operators, that are evaluated for execution of the query based on some efficiency metric.

Relational operators take one or more tables as inputs and generate a new table as the output. For example, a selection operator selects one or more rows of an input table meeting the selection criteria to produce an output table having only those rows. Operators can be composed since an operator may take as input a table generated as the output of another operator. A tree of operators is the representation of a composition of the relational operators appearing as the nodes of the tree.

A tree of such operators for a particular query plan is shown in FIG. 3. As can be observed from the tree of FIG. 3, relational operators are connected to each other and to base tables T1 and T2 by means of queues Q1–Q4. These queues supply input rows to a particular operator and store output rows from the operator. The queues allow an operator to start processing rows as soon as the operator that supplies the rows begins to produce them and before all rows are produced. Such pipelining improves the efficiency of the system because intermediate results need not be stored in a temporary table and then read again for input.

The standard language for implementing a DBMS is the Structured Query Language (SQL). This language includes Triggers, which are actions executed by the DMBS under certain conditions.

A database having a set of triggers is called an active database and each trigger in the database has three parts, an event, a condition and an action. The event part is a change to the database, such as an insertion, deletion, or modification of a table, that activates the trigger. The SQL statement which is the activating event, is termed the activating statement. A condition is a test by the activated trigger to determine whether the trigger action should occur and an action is an SQL statement that is executed if the trigger event and trigger condition are both satisfied. The set of rows affected (i.e., inserted, updated, or deleted) by the activating statement is termed the affected set of rows for the relevant trigger.

The action part of the trigger can occur either before or after the activating statement. If before, it is called a before-trigger and if after, it is called an after-trigger. In addition, triggers can operate at the row level or the statement level. A statement trigger executes its action once per activating statement and a row trigger executes its action for each row in the affected set. The combination of "before" and "after" with "row" and "statement" creates four different types of triggers. Chain reactions of trigger actions and recursive trigger actions are also possible.

The execution of triggers in a relational database is governed by the proposed ANSI standard for SQL (SQL:1999) which places certain restrictions on trigger execution. A chief restriction is that the triggers be executed serially in their creation time order or at least that the serial execution of triggers be equivalent in outcome and effect on the database to the execution of triggers in their creation time order. However, the serial execution of triggers, in accordance with the proposed ANSI:99 standard, would seriously affect the performance of the DMBS, especially if many trigger actions are involved. Thus, there is a need for the improved execution of multiple trigger actions which leads to improved performance of trigger actions over a purely sequential execution, but still conforms to the ANSI standard.

BRIEF SUMMARY OF THE INVENTION

The present invention is directed towards the above need. A method of forming an execution plan in accordance with the present invention includes the following steps. First, any triggers that may be activated by an activating statement and any rows in database tables that are affected by the activating statement are determined. An operator tree for the activating statement is then formed and a tree for the trigger that is activated by the activating statement is formed. The activated trigger is either a row-after trigger or a statement-after trigger. If the activated trigger is a row-after trigger, the tree for the row-after trigger is joined to the operator tree for pipelined execution with the operator tree and any rows affected by the activating statement are pipelined to the row-after trigger for input. If the activated trigger is a statement-after trigger, the tree for the statement-after trigger is joined to the operator tree for execution subsequent to the operator tree. The statement-after trigger obtains input during execution from a temporary table that accumulates affected rows from the execution of the activating statement.

If a plurality of row-after triggers is activated by the activating statement, each of the trees for the row-after triggers is joined to the operator tree for pipelined execution with the operator tree. In one embodiment, the plurality of trees for activated row-after triggers is connected to a parallel union operator to form a group and a flow operator is interconnected between the parallel union operator and the operator tree.

If a plurality of statement after triggers is activated by the activating statement, each of the statement-after trigger trees is joined to the operator tree for execution subsequent to the execution of the operator tree. In one embodiment, the activated statement-after actions are connected to a parallel union operator to form a group, a flow operator is interconnected between the operator tree and a temporary table that accumulates affected rows from the operator tree and an ordered union operator is interconnected between the parallel union operator and the flow operator.

Joining both a plurality of activated row-after triggers and a plurality of statement-after triggers to the operator tree is such that the activated row-after triggers execute in a pipelined fashion with the operator tree and the activated statement-after triggers execute subsequently to the execution of the operator tree. Each trigger tree within either the statement-after group or the row-after group executes in parallel with the other trigger trees in the group.

An advantage is that row after-triggers are executed substantially in parallel with each other and in a pipeline with the execution of the operator tree for the activating statement thereby substantially reducing the execution time of row-after triggers compared to purely sequential execution of the activating statement and the triggers.

Another advantage is that statement-after triggers are executed substantially in parallel with each other thereby substantially reducing the execution time of statement-after triggers compared to the purely sequential execution of the activating statement and the triggers.

Another advantage of the invention is that triggers execute in parallel with the activating statement and groups of triggers that are activated by the same activating statement execute in parallel.

BRIEF DESCRIPTION OF THE DRAWINGS

These and other features, aspects and advantages of the present invention will become better understood with regard to the following description, appended claims, and accompanying drawings where:

DETAILED DESCRIPTION OF THE INVENTION

Figure 1:
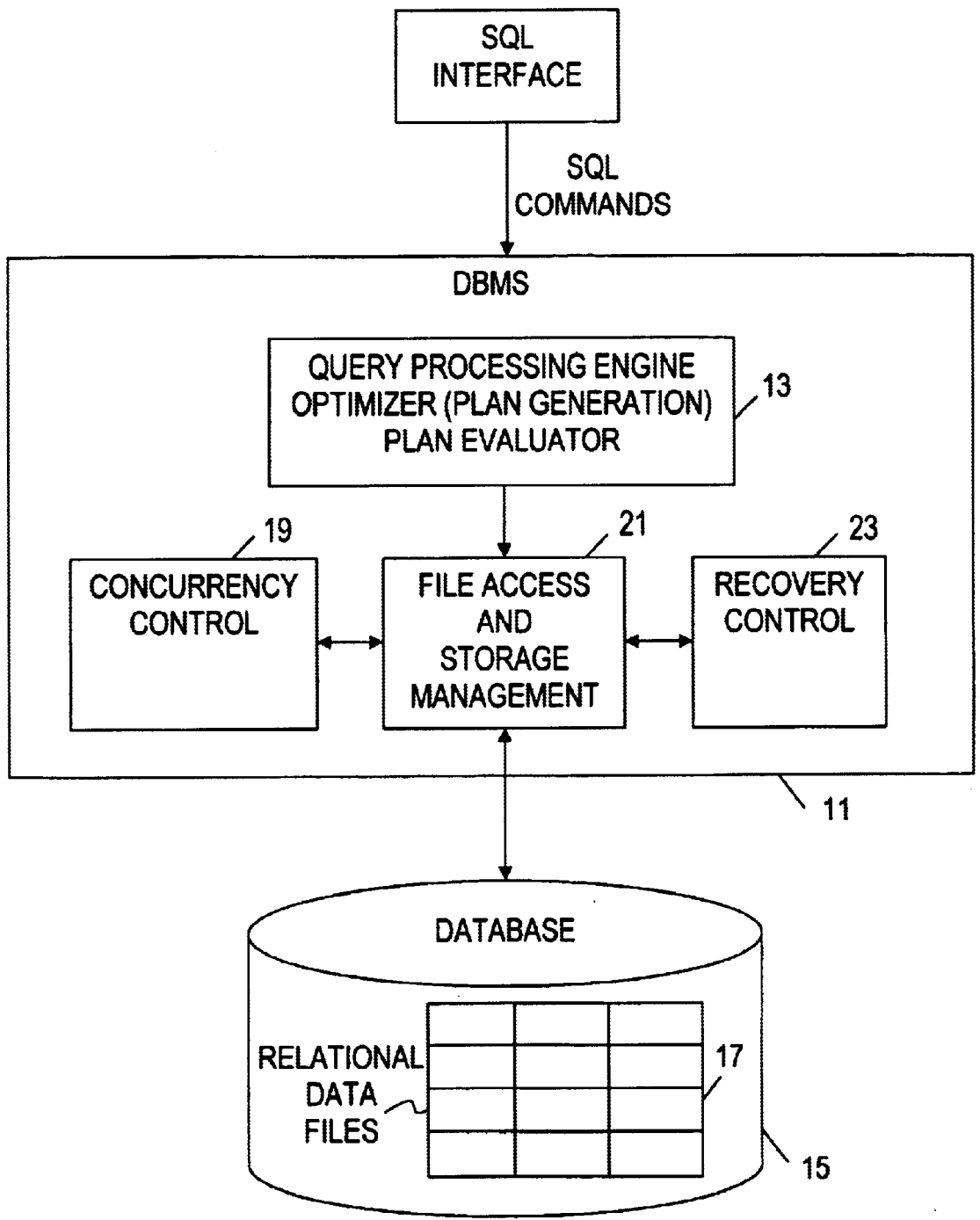
FIG. 1 illustrates a typical database management system.
Figure 2A:
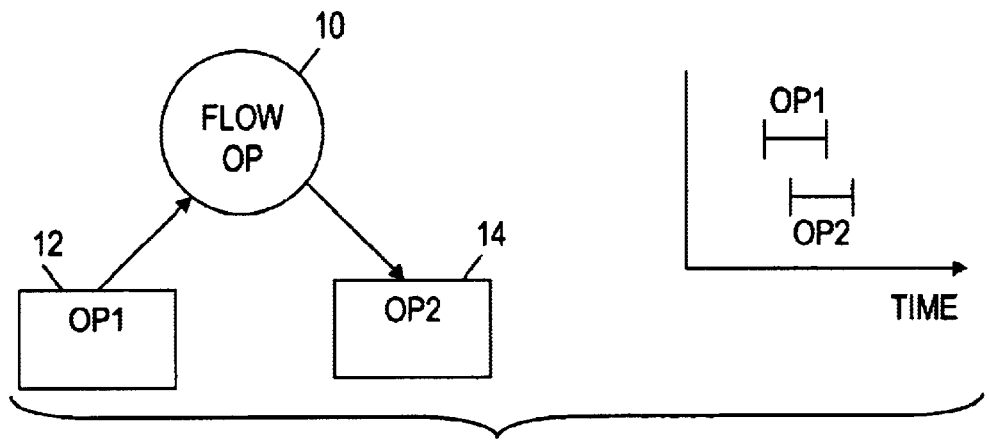
FIG. 2A illustrates a Flow operator.

The present invention relies on a number of operators to control the execution of operations in both an activating statement and its associated trigger trees. The first of these operators is illustrated in FIG. 2A which shows a Flow Operator. The function of this operator is to move the output of operator op1 12 to the input of operator op2 14, as the output of operator op1 is produced. For example, if op1 is a selection operator on a table which selects rows of the table meeting a certain condition, then as the rows meeting the condition are found, say by scanning the table, the rows are sent to the input of op2. This permits the op2 operator to function in parallel to the op1 operator, though, of course, not on the same row that op1 is operating on. FIG. 2A illustrates this "pipelining" operation in a timing chart which shows the activity of op1 overlapped with the activity of op2.

Figure 2B:
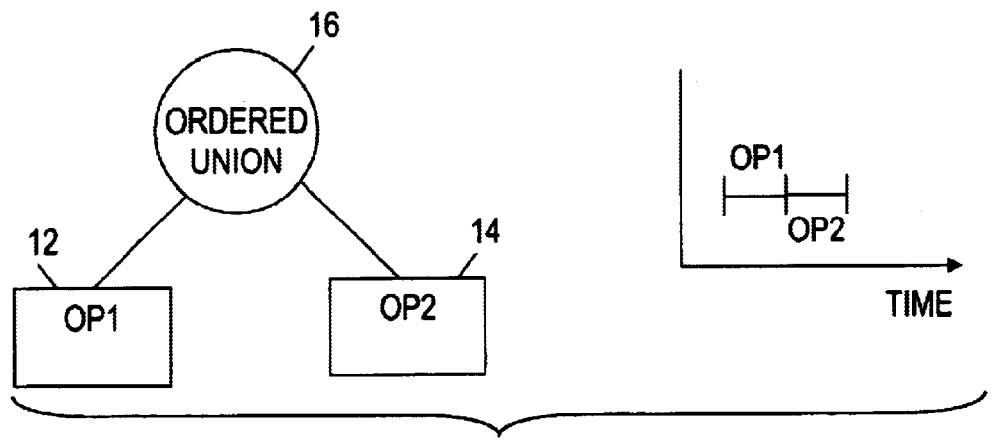
FIG. 2B illustrates an Ordered Union Operator.
Figure 2C:
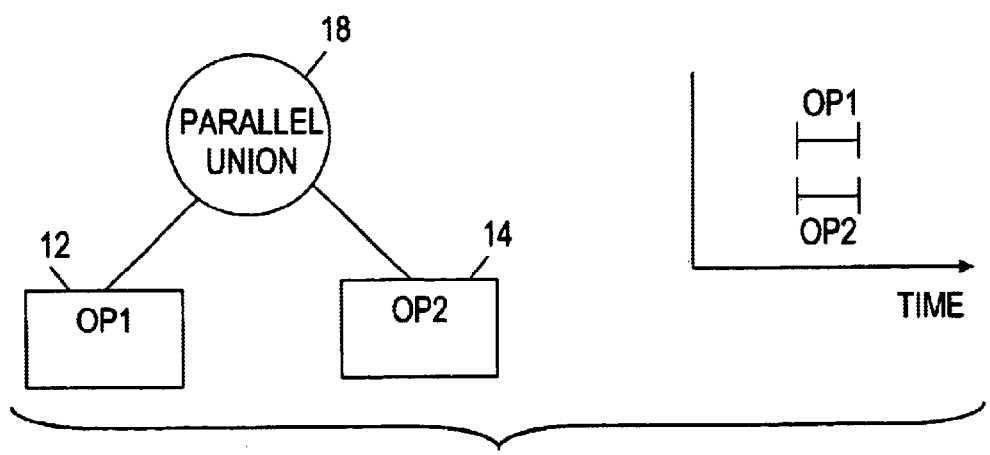
FIG. 2C illustrates a Parallel Union Operator.

FIGS. 2B and 2C illustrate the Union Operators. The Ordered Union operator 16 of FIG. 2B forces op2 to operate only after op1 has completed its operations, in effect serializing the op1, op2 operations as shown in the timing chart. The Parallel Union operator 18 allows op2 to operate concurrently with op1, and assumes that op2 has no data access conflict with op1. As is evident from FIGS. 2A and 2C, the flow operator 10 and the parallel union operator 18 reduce the time to carry out the functions of the op1 and op2 operators compared to the ordered union operator 16.

Figure 3:
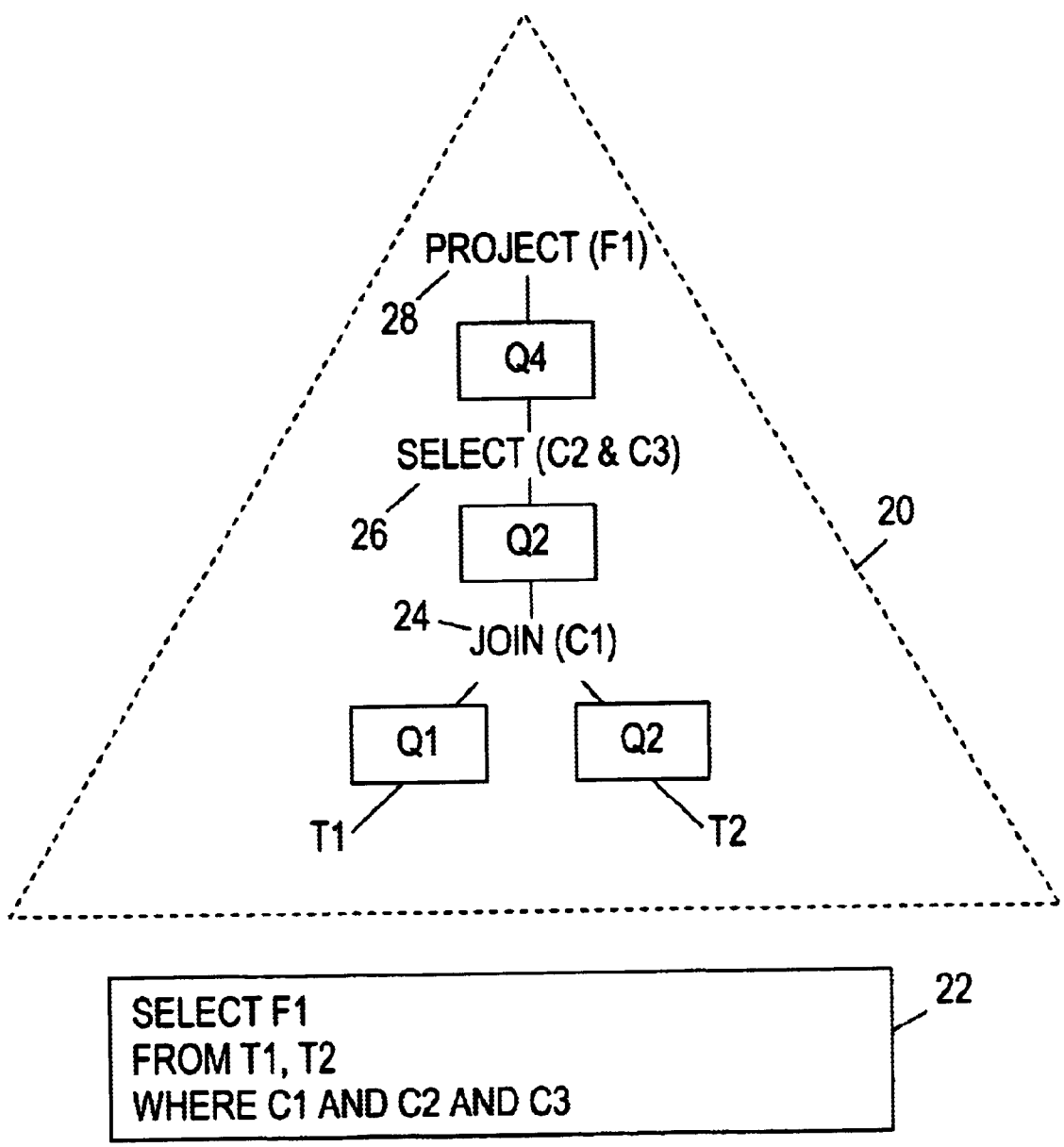
FIG. 3 shows an operator tree for a statement.

Referring to FIG. 3, an operator tree 20 is shown for the given SQL statement 22. The SQL statement 22 projects a desired column F1 from the table created by joining tables T1, T2 and selecting the rows that meet the conjunction of conditions C1, C2 and C3. The operator tree 20 shows one way of implementing the SQL statement 22. According to the tree, first T1 and T2 are joined based on condition C1 by the join operator 24. Next, a selection operator 26 selects the rows of the joined table that meet the condition which is the conjunction of C2 and C3. Finally, a projection operator 28 selects the column F1 from any rows that result from the prior operations. As described above, the function of a Query Optimizer is to form alternative execution plans for a query so that the plans can be evaluated in terms of some performance metric. The tree in FIG. 3 is only one such tree that a Query Optimizer can produce for the given SQL statement.

Figure 4:
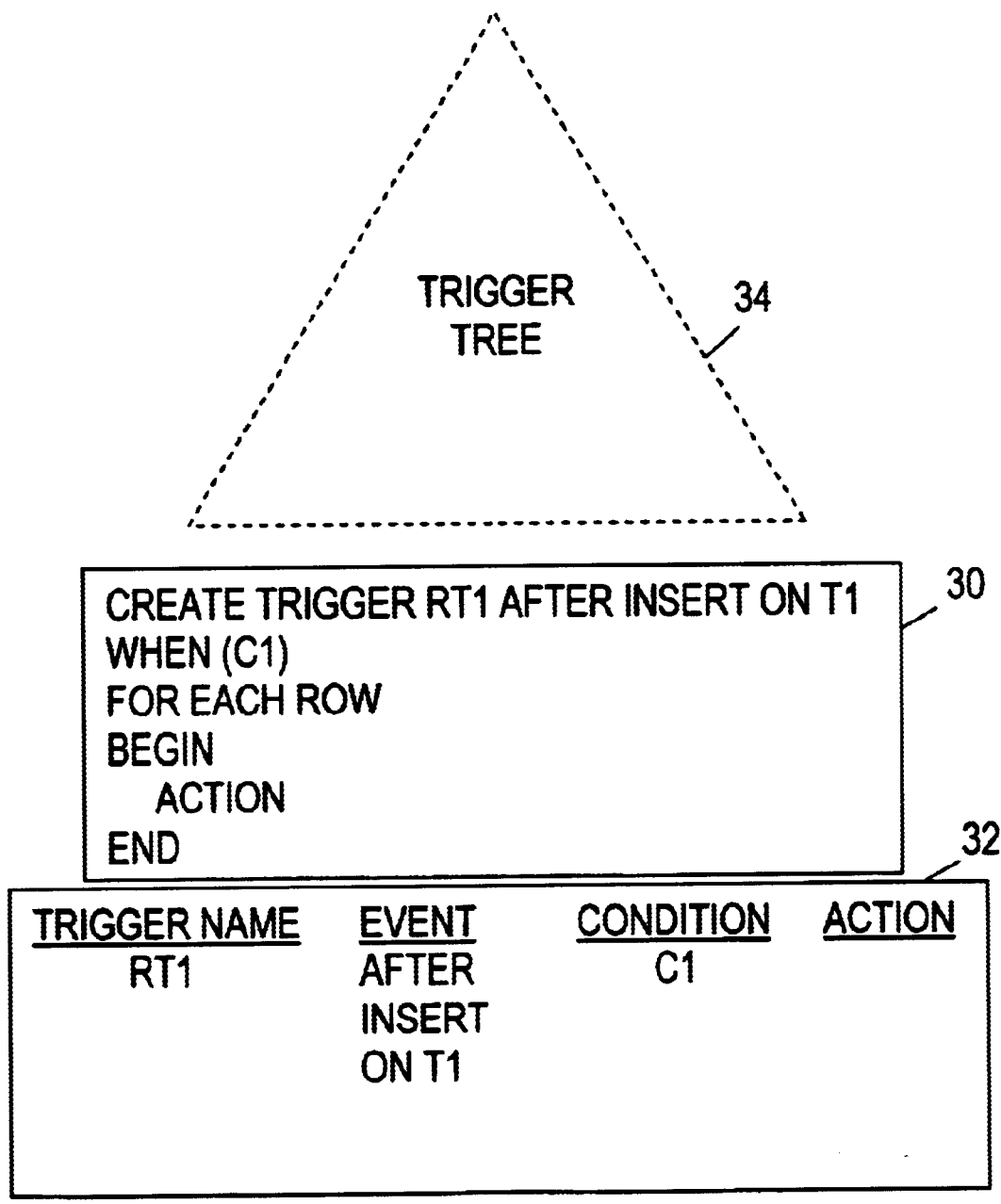
FIG. 4 shows a trigger tree and a representative statement for a trigger.

FIG. 4 shows an SQL statement 30 for a row after-trigger, rt1. The event, condition and action for the trigger are shown in block 32. The event for rt1 is a row insertion into a table T1; the condition is C1, which can be an arbitrary relational condition and the ACTION part of the trigger can be practically any sequence of SQL statements. The trigger tree 34 represents both the condition and the action parts of the trigger.

Figure 5:
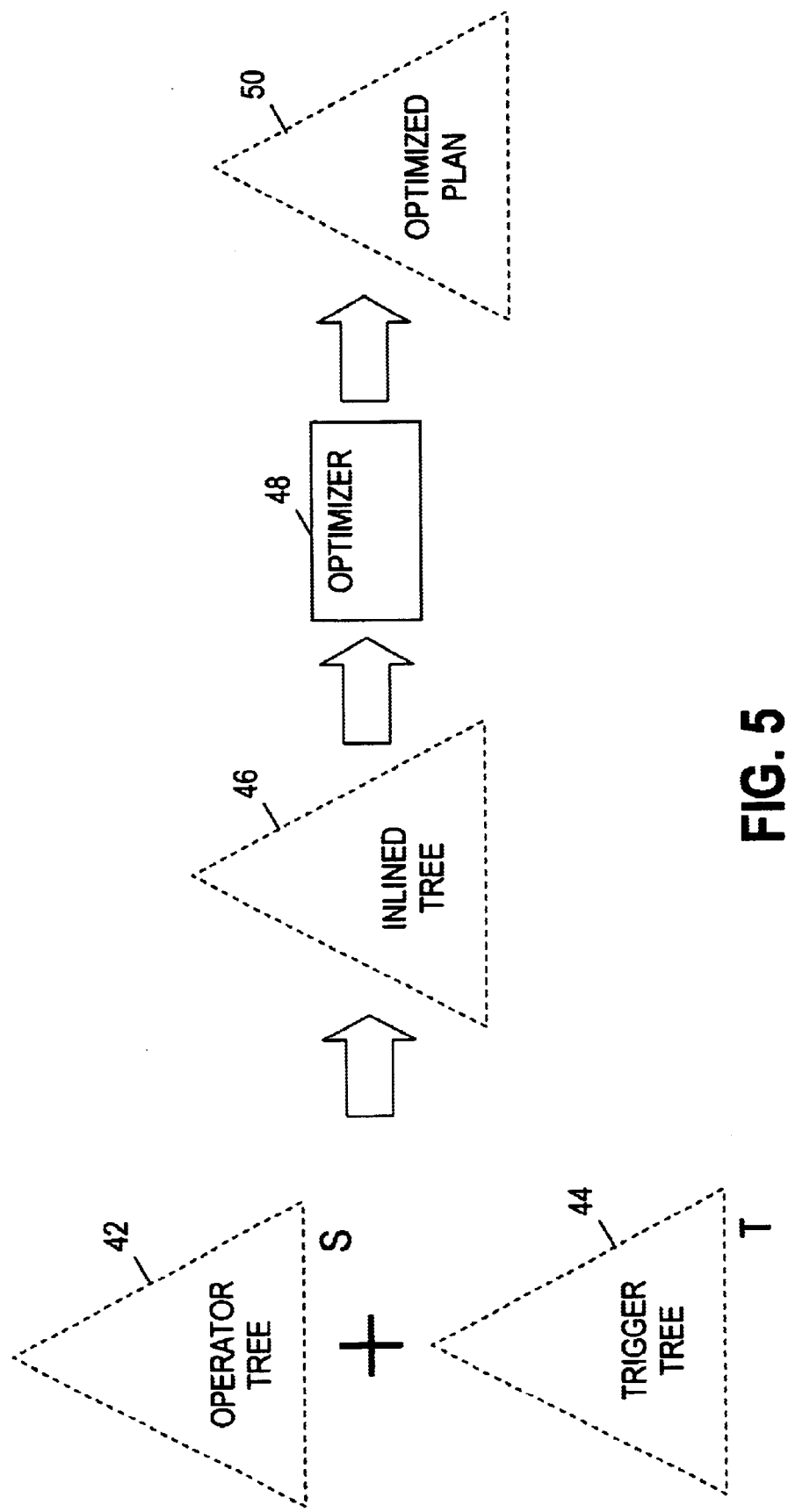
FIG. 5 shows an overview of an aspect of the present invention.

FIG. 5 shows an overview of the present invention. In FIG. 5, an operator tree 42 for an activating statement S is combined, i.e., "inlined," with a trigger tree 44 of a trigger T activated by the statement to create an inlined tree 46. The inlined tree 46 is then processed by an optimizer to create an optimized execution plan 50 for the operators and trigger trees caused by the activating statement S.

Figure 6A:
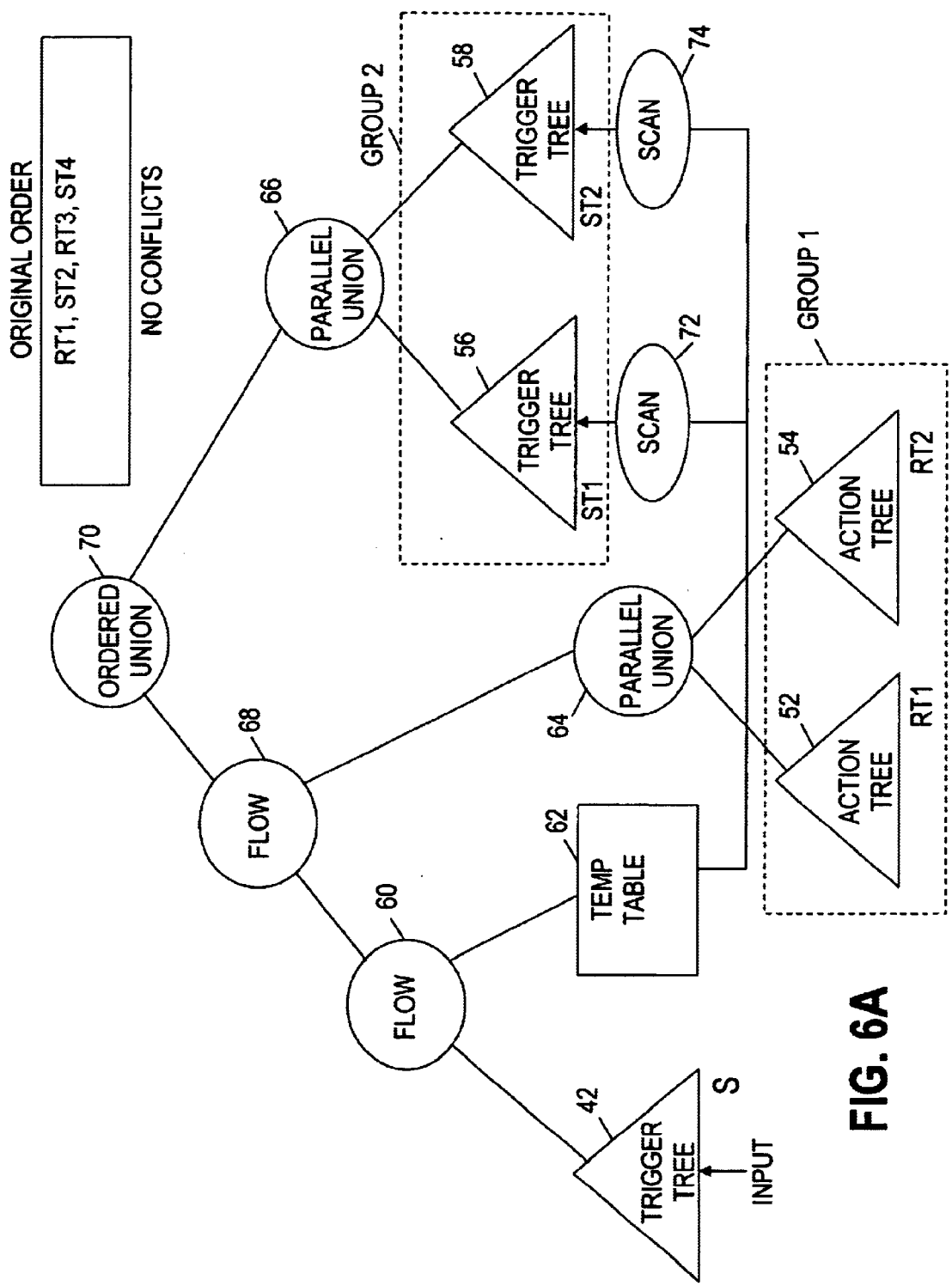
FIG. 6A illustrates a more detailed execution plan in accordance with the present invention.
Figure 6B:
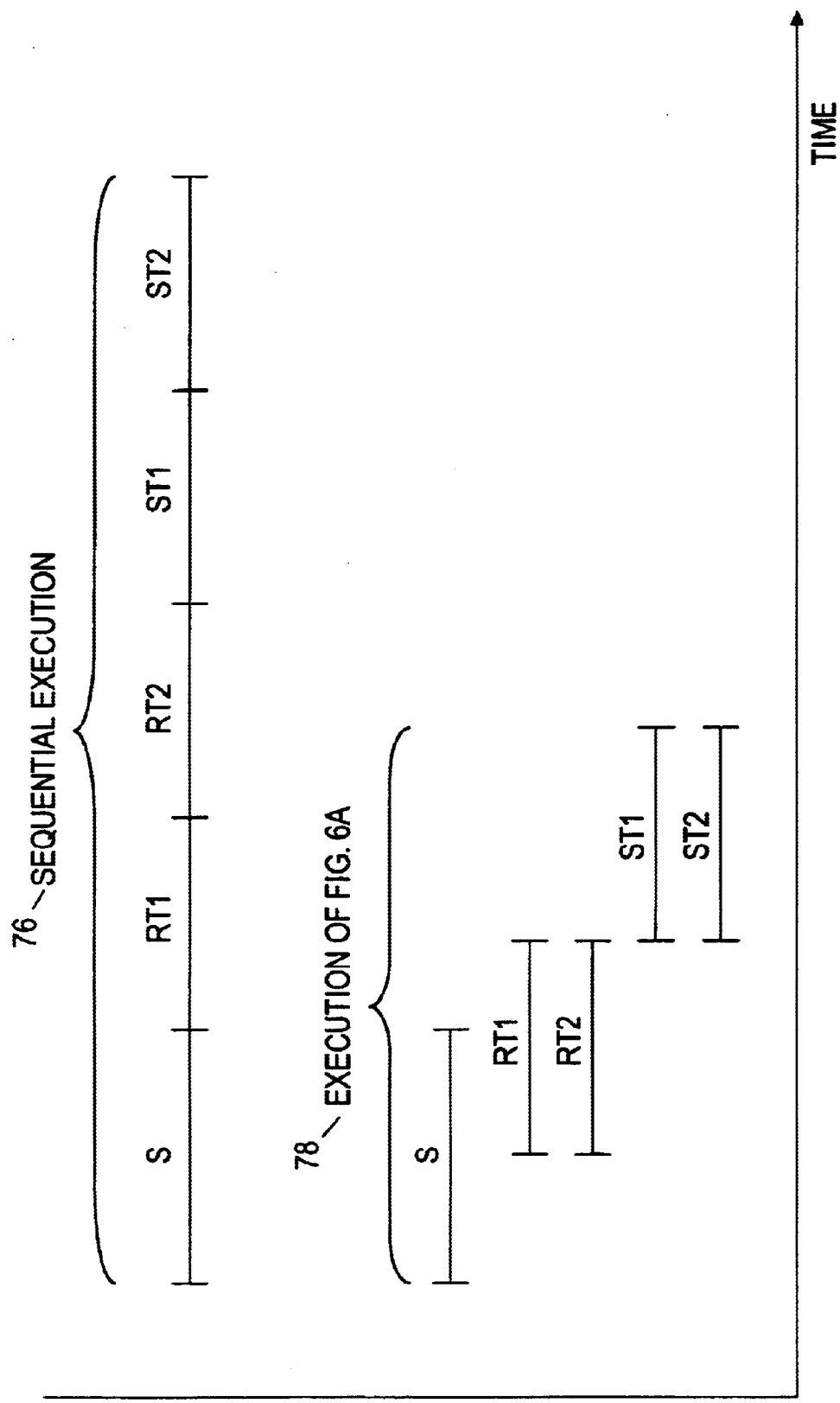
FIG. 6B illustrates a timing chart for the plan of FIG. 6A.

FIG. 6A illustrates a more detailed execution plan formulated in accordance with the present invention illustrated in FIG. 5. In FIGS. 6A and 6B it is assumed that there are no data access conflicts among the activated triggers and between the activated triggers and the activating statement and that all of the activated triggers are after-triggers.

Referring to FIG. 6A, statement S is represented by an operator tree 42, row triggers rt1 and rt2 are represented by trees 52, 54, respectively, and statement triggers st1 and st2 are represented by trees 56 and 58, respectively. It is assumed that statement S is the event that causes activation of the row and statement triggers. In accordance with the present invention, the operator tree 42 produces, as output, the set of affected rows. A flow operator 60 connects the operator tree 42 for statement S to a temporary table, TempTable 62, so that rows that are output by the operator tree 42 are pipelined to the temporary table, TempTable 62. Parallel union operators 64 and 66 connect the trees 52, 54 for rt1 and rt2 and the trees 56, 58 for st1 and st2 so that trees 52 and 54 execute in parallel and trees 56 and 58 execute in parallel.

Another flow operator 68 connects the parallel union operator 64 for rt1 and rt2 to the flow operator 60 connected to the operator tree 42 for statement S so that action trees 52 and 54 execute pipelined to the execution of the statement tree 42. Finally, an ordered union operator 70 connects the flow operator 68 to the parallel union operator 66 for st1 and st2 so that the trees 56 and 58 execute subsequent to the execution of the statement tree 42. The statement trees 56 and 58 receive their inputs by scanning the temporary table, TempTable 62, as represented by the scan functions 72 and 74.

The effect of structure of FIG. 6A is that the row triggers execute in parallel with each other and pipelined with the activating statement and statement triggers execute in parallel with each other but subsequent to the activating statement. Specifically, the structure operates as follows. The operator tree 42 of S operates to generate a stream of affected rows. As the operator tree for S produces the stream of rows, each row is pipelined by the flow operator 60 to the TempTable 62 to prepare for the operation of the statement trigger st1 and st2, which must execute only after statement S is completed. TempTable 62 accumulates the set of affected rows that were produced by the operator tree 42 for S. These changes may need to be made available to the statement trigger trees st1 and st2. Additionally, each row produced by statement S operator tree 42 is pipelined to the row trigger trees rt1 and rt2, which execute in parallel on the pipelined rows. Upon completion of the execution of statement S, and the row triggers rt1 and rt2, the statement triggers st1 and st2 are allowed to execute because of the ordered union operator 70. The statement trigger trees execute in parallel with each other by scanning the TempTable 62 for input data as needed. After the temporary table is used, the contents of the temporary table are deleted by a special delete operator The timing of the execution plan 76 of Statement S, rt1, rt2, st1 and st2, according to the structure of FIG. 6A, is illustrated in FIG. 6B, where S represents the time to execute the statement tree 42, rt1, the time to execute the rt1 action tree 52, rt2 the time to execute the rt2 action tree 54, st1 the time to execute the st1 action tree 56, and st2 the time to execute the st2 action tree 58. As can be noted from the figure, rt1 and rt2 execute in parallel and overlap with the execution of statement S because of pipelining. Statement triggers st1 and st2 execute in parallel but only after the execution of the row triggers. This gives a large decrease in the time to execute the statement S and its associated triggers compared to the case of sequential execution 74 shown in the figure.

Figure 7:
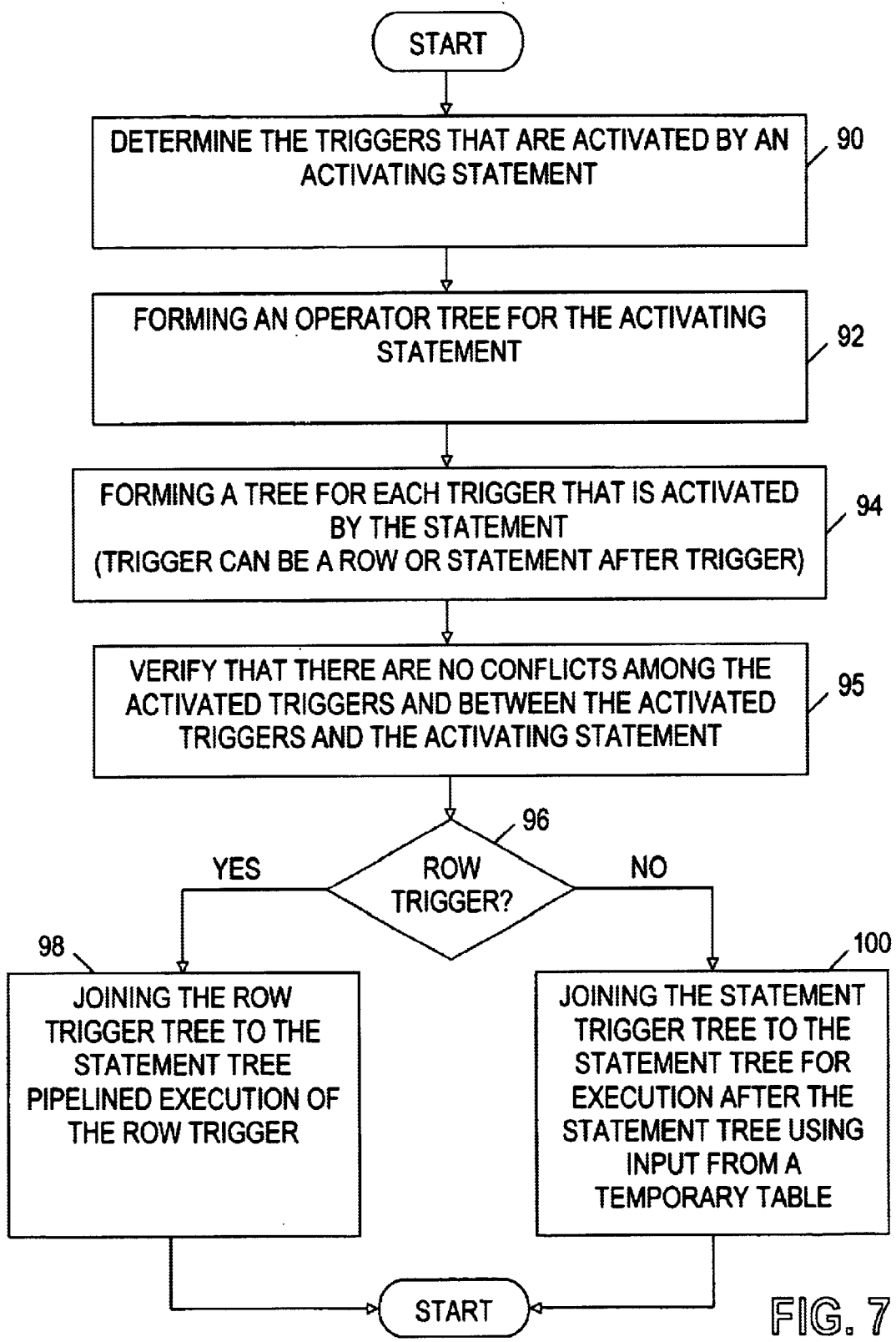
FIG. 7 shows a flow chart for creating an execution plan in accordance with the present invention.

FIG. 7 shows a flow chart of the process for creating an execution plan such as is shown in FIG. 6A. In the process depicted, first the triggers that may be activated by the activating statement are determined in step 90 and an operator tree of the activating statement is formed in step 92. Next, a trigger tree for each of the activated triggers is formed in step 94 and, in step 95, the process then verifies that there are no conflicts among activated triggers and between the activated triggers and the activating statement. An activated trigger is either a row or statement trigger as determined by step 96. If a row trigger is activated, it is joined to the action tree for pipelined execution with the execution of the statement tree in step 98. If a statement trigger is activated, it is joined, in step 100, to the statement tree for execution after the execution of the statement tree using a temporary table as input for the action of the statement trigger. The temporary table accumulates the set of affected rows. The statement trigger scans the temporary table for its input.

The above covers the case of a single row trigger or statement trigger. If more than one row or statement trigger is activated by the activating statement, the row or statement triggers must be combined into the execution plan. In particular, if a number of row triggers is activated, the activated row triggers are combined together into a parallel row group (Group 1 in FIG. 6A) and this parallel row group is the object that is attached to the statement tree for pipelined execution. Internal to the parallel group, each trigger is interconnected by means of a parallel union operator to permit parallel execution of each row trigger within the group. Thus, the execution plan according to the present invention prescribes that each trigger in the parallel group executes in parallel with the other triggers in the group and the entire group execute in a pipeline with the activating statement tree.

If a number of statement triggers is activated, the activated statement triggers are combined together into a parallel statement group (Group 2 in FIG. 6A) and this parallel statement group is the object that is attached to the statement tree for execution subsequent to the statement tree. Again, internal to the parallel group, each trigger is interconnected by means of a parallel union operator to permit parallel execution of each statement trigger within the group. Additionally, each statement trigger during its execution typically scans the TempTable 62 for its input. The execution plan thus prescribes that the statement triggers execute in parallel and the entire group executes subsequent to the execution of the activating statement tree.

Of course, it is possible that both a plurality of row triggers and a plurality of statement triggers are activated by the activating statement. This means that the final execution plan combines the actions trees of both the activated statement triggers and row triggers according to FIG. 6A.

Although the present invention has been described in considerable detail with reference to certain preferred versions thereof, other versions are possible. Therefore, the spirit and scope of the appended claims should not be limited to the description of the preferred versions contained herein.

What is claimed is:

1. A method of forming an execution plan for at least one trigger in an active database, comprising:

determining any triggers that may be activated by an activating statement;

determining any rows affected by the activating statement;

forming an operator tree for the activating statement;

forming a tree for the triggers that are activated by the activating statement, wherein the activated trigger is either a row-after trigger or a statement-after trigger;

if the activated trigger is a row-after trigger, joining the tree for the row-after trigger to the operator tree for pipelined execution with the operator tree, wherein any rows affected by the activating statement are pipelined to the row-after trigger for input; and if the activated trigger is a statement-after trigger, joining the tree for the statement-after trigger to the operator tree for execution subsequent to the operator tree, the activated statement-after trigger obtaining input during execution from a temporary table that accumulates affected rows from the execution of the activating statement;

wherein joining the tree for the activated statement-after trigger to the operator tree of the activating statement for execution subsequent to activating statement includes:

interconnecting a flow operator between the temporary table and the activating statement tree; and interconnecting an ordered union operator between the flow operator and the tree for the activated statement-after trigger.

2. A method of forming an execution plan for at least one triggers in an active database as recited in claim 1, wherein the joining the tree of row triggers to the operator tree of the activating statement for pipelined execution includes interconnecting a flow operator between the trigger tree and the tree of the activating statement.

3. A method of forming an execution plan for at least one trigger in an active database, comprising:

determining any triggers that may be activated by an activating statement;

determining any rows affected by the activating statement;

forming an operator tree for the activating statement;

forming a tree for the triggers that are activated by the activating statement, wherein the activated trigger is either a row-after trigger or a statement-after trigger;

if the activated trigger is a row-after trigger, joining the tree for the row-after trigger to the operator tree for pipelined execution with the operator tree, wherein any rows affected by the activating statement are pipelined to the row-after trigger for input; and if the activated trigger is a statement-after trigger, joining the tree for the statement-after trigger to the operator tree for execution subsequent to the operator tree, the activated statement-after trigger obtaining input during execution from a temporary table that accumulates affected rows from the execution of the activating statement;

wherein there are a plurality of row-after triggers activated by the activating statement;

wherein forming a tree for at least one trigger action that is activated by the activating statement includes forming trees for the plurality of activated row-after triggers; and wherein joining the row-after tree to the statement tree includes joining each tree of the plurality of trees for the plurality of activated row-after triggers to the tree of the activating statement for pipelined execution with the tree.

4. A method of forming an execution plan for triggers in an active database as recited in claim 3, wherein the plurality of trees for the plurality of activated row-after triggers forms a parallel row group; and wherein the step of joining each free to the statement tree for pipelined execution with the statement tree includes:

connecting each tree to a parallel union operator; and interconnecting a flow operator between the parallel union operator and the operator tree.

5. A method of forming an execution plan for at least one trigger in an active database, comprising:

determining any triggers that may be activated by an activating statement;

determining any rows affected by the activating statement;

forming an operator tree for the activating statement;

forming a tree for the triggers that are activated by the activating statement, wherein the activated trigger is either a row-after trigger or a statement-after trigger;

if the activated trigger is a row-after trigger, joining the tree for the row-after trigger to the operator tree for pipelined execution with the operator tree, wherein any rows affected by the activating statement are pipelined to the row-after trigger for input; and if the activated trigger is a statement-after trigger, joining the tree for the statement-after tripper to the operator tree for execution subsequent to the operator tree, the activated statement-after trigger obtaining input during execution from a temporary table that accumulates affected rows from the execution of the activating statement;

wherein there are a plurality of statement-after triggers activated by the activating statement;

wherein forming a tree for at least one trigger that is activated by the activating statement includes toning trees for the plurality of activated statement-after triggers; and wherein the joining the statement-after tree to the statement tree includes joining each tree of the plurality of trees for the plurality of activated statement-after triggers to the tree of the activating statement for execution subsequent to the tree.

6. A method forming an execution plan for triggers in an active database as recited in claim 5, wherein the plurality of trees for the plurality of activated statement-after triggers forms a parallel statement group; and wherein the step of joining each tree to the statement tree for execution subsequent to the statement tree includes:

connecting each tree to a parallel union operator; and interconnecting a flow operator between the temporary table and the operator tree; and interconnecting an ordered union operator between the parallel union operator and the flow operator.

* * * * *